UNITED STATES PATENT OFFICE.

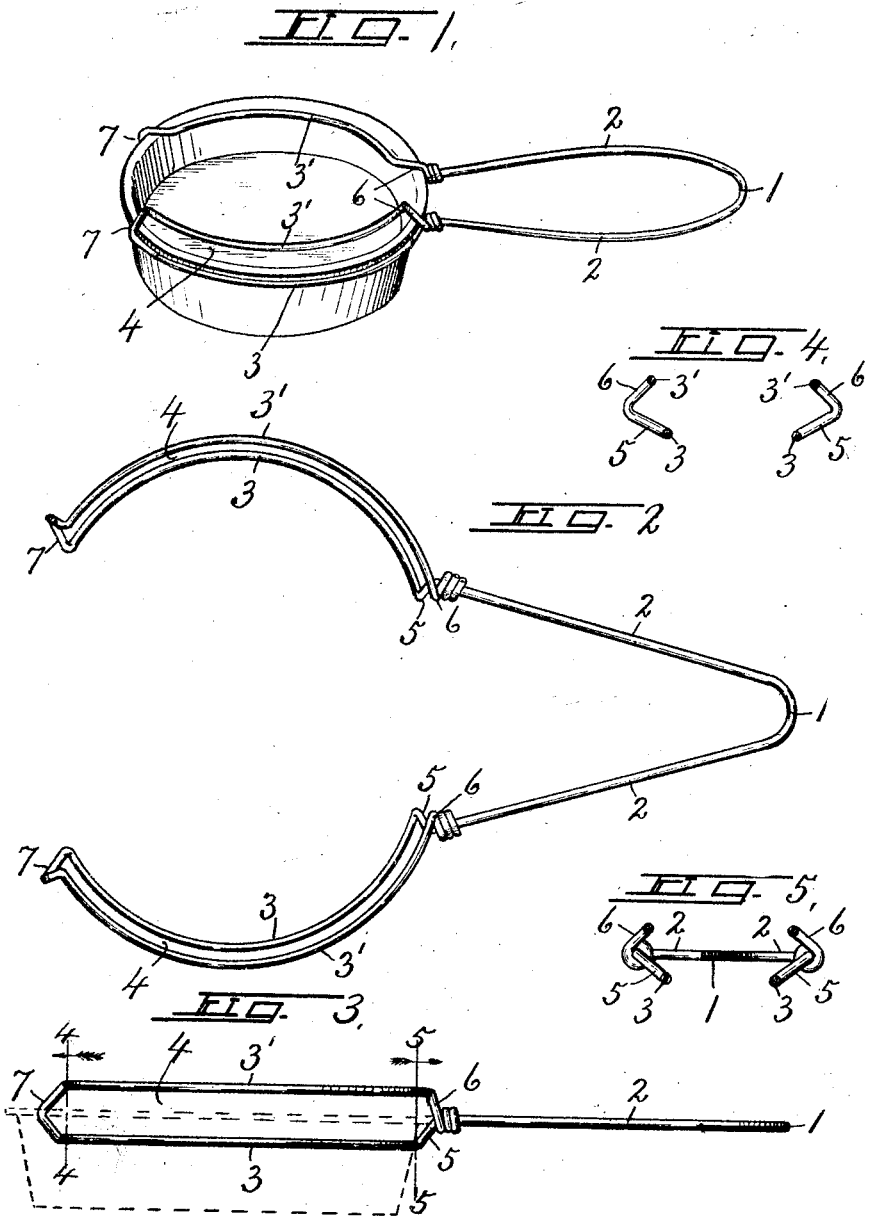

HARRY C. GATES, OF PROCTOR, VERMONT.

LIFTER.

1,156,138.

Specification of Letters Patent.

Patented Oct. 12, 1915.

Application filed March 7, 1913. Serial No. 752,648.

*To all whom it may concern:*

Be it known that I, HARRY C. GATES, a citizen of the United States, and resident of Proctor, in the county of Rutland, in the State of Vermont, have invented new and useful Improvements in Lifters, of which the following, taken in connection with the accompanying drawings, is a full, clear, and exact description.

This invention relates to certain improvements in lifters for handling pie tins, basins, kettles and similar kitchen utensils and in placing them into or withdrawing them from the oven or surface of stoves, ranges or other heating or baking apparatus.

The main object is to provide a simple and comparatively inexpensive gripping and lifting device which may be applied to a wide range of uses in handling or manipulating various forms of receptacles which would be inconvenient or impracticable to carry or manipulate by the hands.

In other words, I have sought to increase the range of usefulness and efficiency of this class of implements and, at the same time, to render it light, strong and durable and capable of being manufactured and sold at a comparatively low cost.

Other objects and uses will be brought out in the following description.

In the drawings, Figure 1 is a perspective view of my improved lifting device as applied to an ordinary pie tin or basin. Figs. 2 and 3 are respectively an enlarged top plan and a side elevation of the same lifting device. Figs. 4 and 5 are transverse sectional views taken respectively on lines 4—4 and 5—5, Fig. 3.

The entire lifting device is preferably made of a single piece of spring wire reflexed or returned intermediate its end at —1— to form opposite handle bars or arms —2— which are tensioned to normally spring apart and terminate in longitudinally curved gripping members —3— having their concave faces opposed, the outer ends of the gripping members —3— being reflexed or returned in similarly curved lines toward the handle bars —2— to form additional gripping members —3'—, the ends of which are tightly coiled upon the adjacent ends of the handle bars —2— to rigidly hold them in operative relation to said bars and to the gripping members —3—.

Each pair of gripping members —3— and —3'— constitutes a jaw and, therefore, the ends of the handle bars —2— are provided with longitudinally curved jaws, said gripping members of each set being spaced apart vertically in substantially parallel horizontal planes, thereby forming intervening lengthwise slots —4— for the reception of the rim of a vessel to which the jaws are adapted to be applied in lifting or manipulating such vessel.

One set of gripping members, as —3'—, are of similar curvature but of greater radius than the other gripping members —3— so as to conform as nearly as possible to the usual taper of the sides of a vessel below the rim when the jaws of the implement are applied to the main body of the vessel and also permitting the same lower jaws to engage the body of such vessel just beneath the rim while the other set of gripping members overhang the rim and serve as retainers to hold the vessel against undue vertical movement relatively to the jaws. On the other hand, if the sides of the upper portion of the vessel happen to taper upwardly, the implement may be inverted and one or more of the corresponding gripping members of both jaws applied to the sides or to the rim thereof.

The gripping members of each jaw are preferably disposed in planes below and above and equi-distant from the plane of the handle bars —2— and, in order to accomplish this result, the inner ends of the gripping members —3— at their junctions with the adjacent ends of the handle bars —2— are offset at —5— vertically so as to incline downwardly and inwardly from the vertical planes of their respective handle bars —2— while the adjacent ends of the gripping members —3'— are also offset at —6— and disposed in planes inclining downwardly and outwardly or at an angle with the vertical planes of said handle bars so as to form a V-shaped recess between the offset portions —5— and —6— as shown more clearly in Fig. 5.

The outer ends of the members —3— and —3'— of each set are united by integral cross bars —7— having their central portions deflected or bent outwardly to form V-shaped recesses, all of which recesses are registered with their corresponding slots —4— for receiving the rim of a vessel and thereby more effectively retaining it between the gripping jaws when the implement is applied to the rim of such vessel. These recesses and their corresponding slots —4— permit the implement to be applied to receptacles of widely varying diameters with the assurance that the rim of such receptacle will enter the slots or recesses of both.

The arc lengths of the jaws are substantially equal but considerably less than a half circle, thus permitting the jaws to be brought close together in gripping small receptacles or they may be spread a considerable distance apart beyond their normally tensioned position for receiving and gripping large receptacles, it being understood that when the device is in the open position, as shown in Fig. 2, lines drawn through the handles to longitudinally coincide with their axes, will intersect the members 3, 3', so that the bars 7 will lie in advance of such lines whereby the forward extremities of the jaws will first contact with the article to be gripped. It is to be observed also, that the bend at the bight portion of the handle is abrupt, which tends to give the bight portion stiffness and thereby cause the handle portions 2 to flex as shown in Fig. 1, to aid in causing the aforesaid contact between the pan and the jaws to occur first at the forward extremities of the jaws.

Another advantage of making the corresponding gripping members of different radii is to increase its range of usefulness on receptacles of different sizes as well as different tapers and also to enable the device to be used not only for lifting and carrying heated receptacles to and from an oven but also for tilting receptacles containing liquids or fluid substance in pouring such substance from one receptacle to another, the gripping members —3— and —3'—, which are adapted to engage the lower and upper sides of the rim of the receptacle, serving to firmly hold the same against accidental displacement upon the jaws.

I have shown and described this lifting device as consisting of a single piece of wire as the most economical and efficient means of forming the lengthwise slots and recesses referred to in the construction of the jaws, but it is evident that similar results may be produced by making the various parts of separate pieces of wire or sheet metal and, therefore, I do not limit myself to the precise construction shown and described.

What I claim is:

A plate-lifter comprising a single piece of spring wire, bent abruptly upon itself to provide a U-shaped stiff bight portion and a handle consisting of elongated divergent members connected at their rear ends and having their forward ends offset and curved outward to provide two lowered members extending from said handle of oppositely-disposed gripping jaws, then offset and oppositely-inclined to provide two opposed V-shaped gripping seats at the front ends of said jaws, then outwardly curved to provide the upper members of the jaws in planes above but parallel with the planes of the lower jaw members, then again offset and inclined to co-act with the rear offsets of the lower member to form V-shaped seats at the rear ends of the jaws, and finally twisted around the forward ends of the divergent handle members, the planes of said upper and lower jaw members being respectively above and below the plane of the handle, and said front and rear V-shaped seats being in the same plane with said handle to clamp a plate edge at four points two of which are on one side and the other two at the opposite side of the longitudinal center line of the handle, said front V-shaped seats being arranged to grip the plate edge prior to its engagement by the rear V-shaped seats.

In witness whereof I have hereunto set my hand this 27th day of February, 1913.

HARRY C. GATES.

Witnesses:
B. J. McSHANE,
HOWARD V. SMITH.